May 14, 1963 A. DI SETTEMBRINI 3,089,185
METHOD AND APPARATUS FOR MANUFACTURING HOLLOW PLASTIC OBJECTS
Filed May 31, 1961

United States Patent Office 3,089,185
Patented May 14, 1963

3,089,185
METHOD AND APPARATUS FOR MANUFACTURING HOLLOW PLASTIC OBJECTS
Antoine Di Settembrini, Sucy-en-Brie, France
Filed May 31, 1961, Ser. No. 113,760
Claims priority, application France Mar. 27, 1961
5 Claims. (Cl. 18—5)

The present invention relates to a method and apparatus for manufacturing hollow plastic objects.

Several different methods exist for blowing hollow plastic objects, generally starting with tubular blanks, extruded sections or strips.

Some of these blanks have the drawback of not lending themselves to blowing until they are clear of the extruding head or of that part of the machine which serves to move up the blank, thereby leading to idle times between closure of the mould halves onto the blank and the moment when fluid under pressure is lead into said blank to make it adopt the contours of the article to be produced.

Such idle times are detrimental, in the sense that they slow down the rate of production and allow the blank to "run" to some degree inside the mould, due to the fact that the material is still very hot. This in turn causes very substantial and generally dertimental differences in thickness between the top and the bottom of the article.

Other methods have the drawback of involving blowing from the bottom end namely that the end product is obtained upside down, which, in the case of bottle manufacturing, means that the neck is formed at the bottom, where the blowing takes place.

In comparison with methods in which the bottle is blown right-side up, this method results in over-thickness in the region of the neck and undue thinness at the base of the bottle, and this in turn calls for the addition of extra material in order to ensure a properly dimensioned base.

Indeed, there are comparatively few articles for which it is an advantage to use this inverted blowing method.

Still other methods have the drawback that the blowing is done with a hollow tube of the hypodermic needle type, which limits the rate of input of fluid into the blank. With certain materials, such a hollow tube of the hypodermic needle type also causes a degree of contraction about the tube or needle at the place where the perforation was made, making removal of the needle difficult and limitng its useful life. Another drawback is that in some cases the needle may blunt rapidly so that perforation may become difficult; alternatively, the needle may become clogged with plastic which is still hot, thereby leading to machine stoppages.

The present invention has for its objects a method of manufacturing hollow plastic objects, consisting in placing a blank in the plastic state inside a mould, in smashing in part of said blank and in then injecting fluid under pressure into the blank through the hole opened up therein in order to cause the blank to closely hug the contours of the mold.

The method according to the invention offers the following advantages:

(1) The possibility of setting up the blowing as soon as the half-molds have closed, thereby leading to a saving of time.

(2) The possibility of producing articles in which the neck (where such exists) is located at the top, at the bottom, or even in the middle of the mold.

(3) The possibility of blowing one or more articles simultaneously.

(4) The fact that a tough cutting tool eliminating stoppages can be used.

(5) The ease of adaptation of the method to most blowing machines.

(6) The impossibility of fouling the injection tube or tubes by reason of the fact that the latter are independent of the cutting tool.

(7) The efficient cooling; this is set up, on the one hand, by the water circulating through the mass of the mold and, on the other hand (contrarily to all known principles applied thereto, in which the object has always been to seal off the apparatus delivering the fluid from such part of the blank as receives said fluid), by providing communication between the fluid injection means and the interior of the blank in order to enable the hot fluid to discharge freely, thereby enabling the fluid to be renewed, with consequent reduction of the cooling time and speeding-up of the production rate.

It is a further object of the invention to provide apparatus for performing the aforementioned method.

An embodiment of the present invention is described below, by way of example only and not of limitation, with reference to the accompanying drawings.

Figure 1:
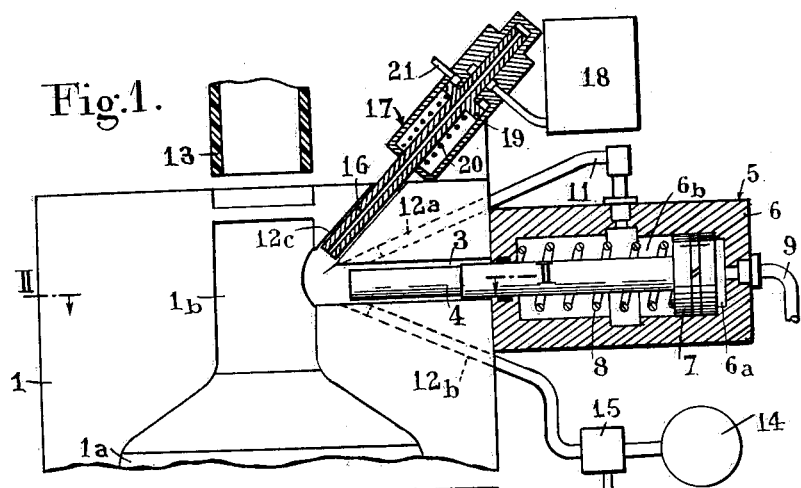
FIGURE 1 is a highly diagrammatic fragmentary elevation view of the half mold used in the apparatus and into which the blowing is effected, the configuration shown being that previous to placing in position of the plastic blank.
Figure 2:
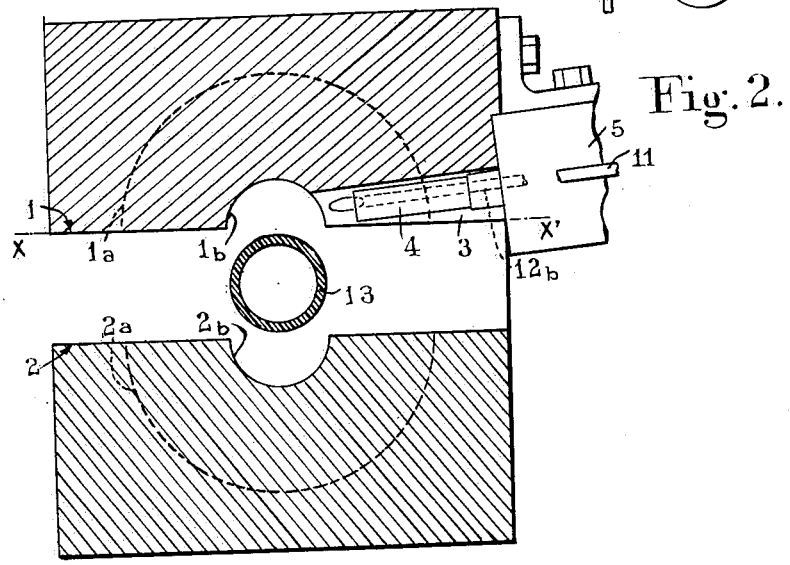
FIGURE 2 is a fragmentary cross-section view through the line II—II in FIG. 1, showing the two half-molds opposite each other.

Referring now to FIGS. 1 and 2, the apparatus according to the invention comprises two half-molds 1 and 2 embodying hollows 1a and 2a reproducing the contours of the hollow object it is desired to produce, namely a bottle in the specific example under consideration. The neck of the bottle being manufactured by means of the mold illustrated is produced in the portions 1b and 2b of the mold which are of reduced cross-section.

The half-mold 1 embodies a passageway 3 providing communication between the mold neck 1b and the surrounding atmosphere. Within passageway 3 is movable a cutting tool 4 of any desired cross-section, and said tool is set obliquely in relation to the mold splitting plane X—X'. In FIGS. 1 and 2, the cutting tool 4 is shown retracted inside the passageway 3.

The cutting-tool 4 is actuated by driving means generally designated by the reference numeral 5. Said driving means may be of any suitable type and be mechanically, hydraulically, pneumatically or electrically operated.

In the example under consideration, said driving means 5 consist of a single-acting pneumatic actuator comprising a cylinder 6 and a piston 7 rigidly connected to the cutting tool 4, said piston being spring-loaded into the inoperative position shown in FIGS. 1 and 2 by a spring 8. The chamber 6a bounded by the piston 7 and the cylinder 6 communicates with a pipe 9 supplying fluid under pressure, the other chamber 6b being connected by a pipe 11 to one or more blowing ducts 12a embodied in the half-mold 1. Said duct 12a debouches into the passageway 3, in the region of the mold neck 1b.

The apparatus may also comprise a discharge duct 12b in the half-mold 1, said duct also debouching into the passageway 3, in the region of the mold neck 1b and being connected to a vacuum generator 14 through the medium of a hydraulically, pneumatically or electrically operated valve 15.

In cases where, in addition to manufacturing hollow objects, the apparatus must fill them with liquid, one of the half-molds can be equipped with means to permit such filling. To this end, the half-mold 1 may embody a supply duct 12c which, like ducts 12a and 12b debouches into the neck 1b substantially at the same point as the passageway 3. Inside said duct 12c is displaceable a hollow rod 16 actuated by a filling device 17 connected to a liquid tank 18. Said filling device 17 may comprise a piston 19 rigidly connected to rod 16, and said piston may be displaced against a compression spring 20 by compressed air supplied through a pipe 21.

Figure 3:
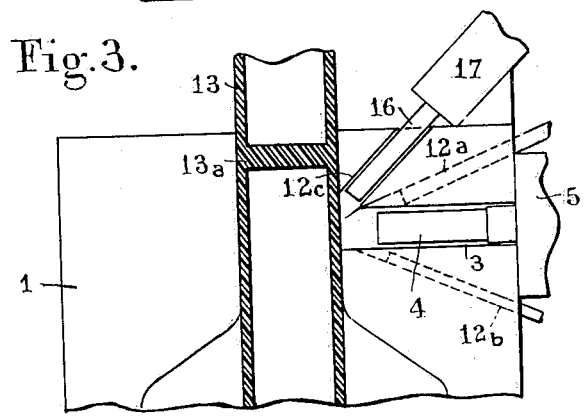
FIGURE 3 is an elevation view similar to that of FIG. 1, the blank being shown introduced and clamped between the two half-molds.
Figure 4:
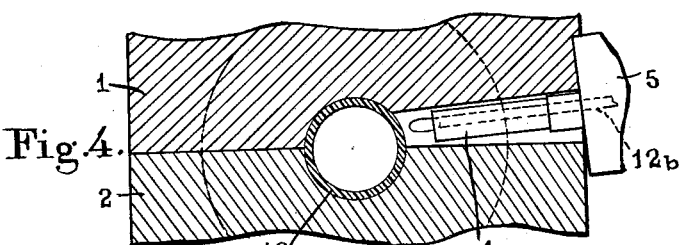
FIGURE 4 is a cross-section view similar to that of FIG. 2, the blank being shown introduced and clamped between the two half-molds.

The blowing method according to the invention will first be explained on the assumption that the hollow object to be manufactured is not to be filled with liquid. The blank 13, which is shown here in the form of a tube but which could just as conveniently come in the form of an extruded section or an endless strip, is disposed outside the half-molds 1 and 2 in FIGURE 1. The blank 13, which is in a softened condition, is then lowered through the desired distance between the half-molds 1 and 2 and the latter clamped against each other, the blank imprisoned between them thus being then cut at 13a (FIGURES 3 and 4).

Figure 5:
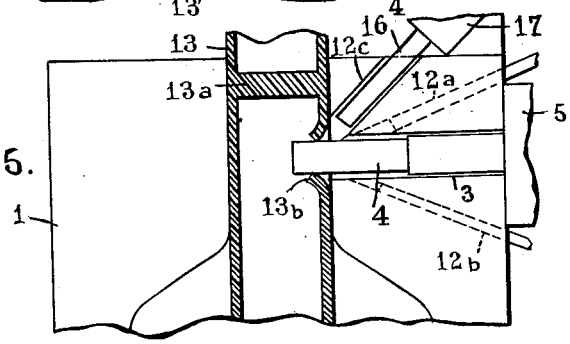
FIGURE 5 is an elevation view showing the smashing in of the blank by the cutting tool.
Figure 6:
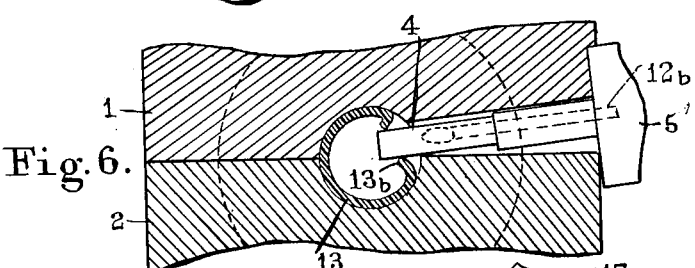
FIGURE 6 is a cross-section view showing the smashing in of the blank by the cutting tool.

The cutting tool 4 is then moved along the passageway 3 until it smashes in the blank 13 at 13b (FIGURES 5 and 6). In the specific example under consideration, this is accomplished by admitting fluid under pressure, via the pipe 9, into the chamber 6a of the pneumatic actuator 5. In the figures, said cutting tool 4 travels leftwards in passageway 3, towards the blank 13.

Figure 7:
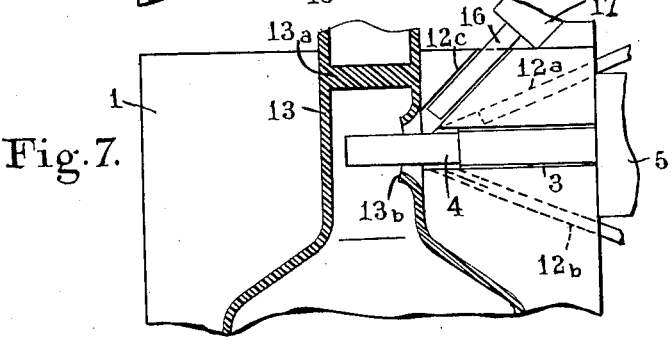
FIGURE 7 is an elevation view illustrating the blowing phase.
Figure 8:
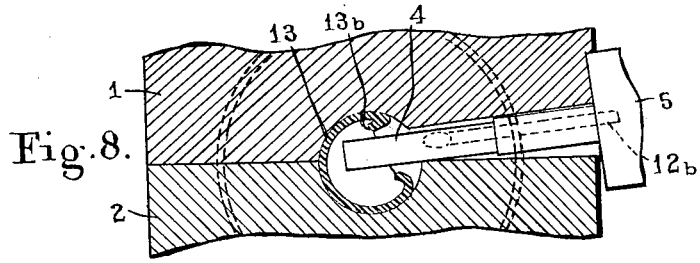
FIGURE 8 is a cross-section view illustrating the blowing phase.

After the cutting tool 4 has smashed in the blank 13, fluid under pressure is admitted into the blowing duct 12a (FIGS. 7 and 8), and said fluid follows the path indicated by the arrows and penetrates, through the hole 13b opened up in the blank 13, into the latter. To this end, displacement of piston 7 in actuator 5 causes communication to be established between the supply pipe 9 and the pipe 11 supplying the blowing duct 12a.

Injection of fluid under pressure via the duct 12a is maintained for as long as is necessary for the blank 13 to hug and retain the shape of the mold.

By reason of the intentional absence of tightness between the cutting tool 4 and its passageway 3, the fluid under pressure injected into the blank 13 emerges therefrom through the gap existing between the cutting tool 4 and the edge of the hole 13b, thereby ensuring continuous circulation of the fluid and more rapid cooling of the plastic.

Figure 9:
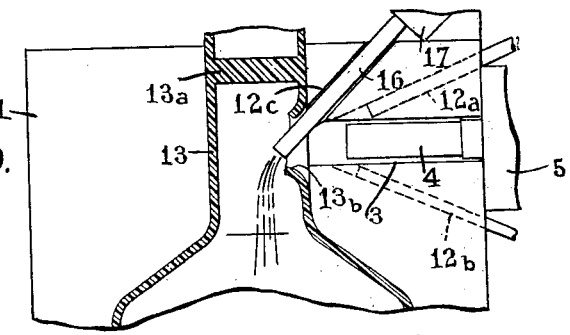
FIGURE 9 is an elevation view subsequent to withdrawal of the cutting tool.
Figure 10:
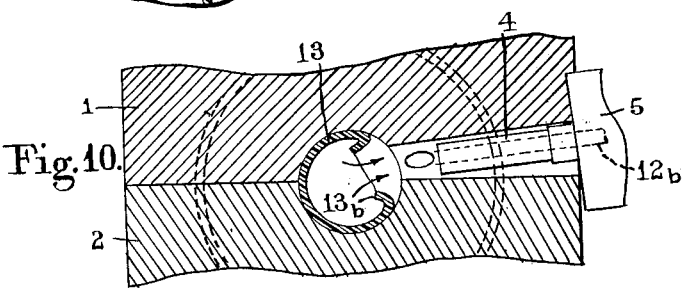
FIGURE 10 is a cross-section view subsequent to withdrawal of the cutting tool.

The cutting tool 4 is then restored into its original position (FIGS. 9 and 10), by stopping the injection of fluid under pressure into the chamber 6a in order to allow the bottle to be released from the mold and also to enable the fluid still remaining under pressure in the bottle to escape more easily.

To assist this evacuation of the fluid, the valve 15 may be opened and an underpressure thereby made to prevail in the discharge duct 12b by the vacuum generator 14, in consequence whereof evacuation of the fluid under pressure and of the volatile products inside the hollow object is expedited.

Any convenient means are then used to release the object after the half-molds have been separated.

In cases where the bottle to be manufactured must be filled with liquid, then, prior to release of the object, there is provoked a displacement of the hollow rod 16 of filling device 17 by setting the pipe 21 under pressure. Said hollow rod 16 (FIG. 9) then protrudes through the hole 13b previously opened up in the bottle, thereby enabling the latter to be filled from the tank 18. After the filling operation is complete, said hollow rod 16 is caused to retract, and the bottle neck is sealed off by welding or any other suitable means.

Figure 11:
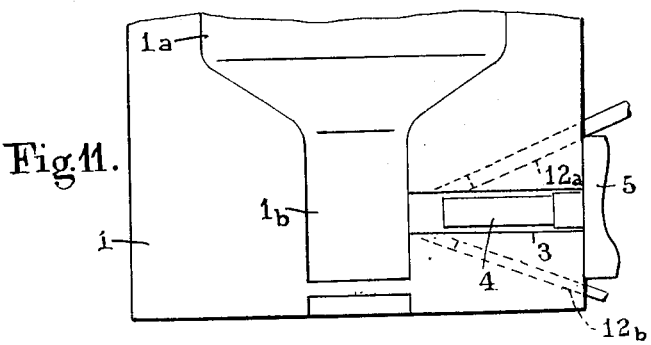
FIGURE 11 is a fragmentary schematic elevation view of a half-mold in which the bottle neck is turned downwards.

The blowing operation can be performed very easily with the bottle neck turned downwards, as shown in FIG. 11. Similarly, a plurality of objects may be made simultaneously by providing several cutting tools and one or more blowing holes per mold.

Figure 12:
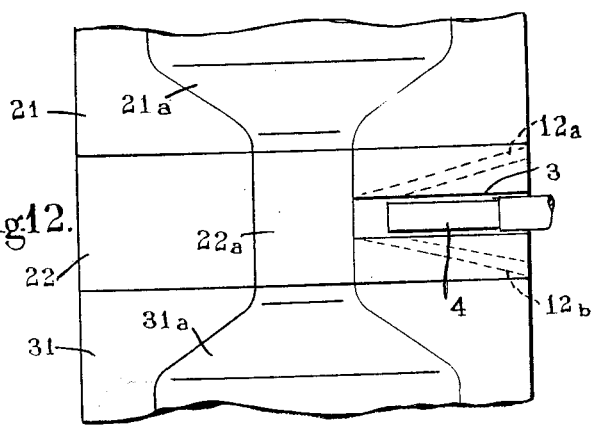
FIGURE 12 is a fragmentary schematic elevation view of a blowing half-mold designed for the manufacture of two articles at once.

The mold shown in FIGURE 12 enables two identical bottles to be made simultaneously in the mold cavities 21a and 31a of the half-molds 21 and 31 respectively.

Between said half molds 21 and 31 is introduced a member 22 which may be provided in the form of an insert and into the centre 22a of which protrudes the cutting tool 4.

It is to be clearly understood that, without departing from the scope of the invention, many modifications may be made to the specific embodiment described hereinabove with reference to the accompanying drawings.

What I claim is:

1. A method of shaping hollow plastic objects including the steps of: enclosing a tubular blank in a hot-softened condition between two half molds, substantially radially smashing in the blank with a cutting tool, keeping the cutting tool in a protruding position inside the blank, injecting fluid under pressure in an annular vein surrounding said cutting tool in order to enlarge the hole which has been smashed in and to cause the blank to be blown and applied against the walls of the half molds, whereby a rapid cooling of the blank is ensured by continuous circulation of fluid under pressure in the annular opening around said cutting tool, then moving back said cutting tool outside the shaped hollow object, stopping the injection of fluid under pressure, enabling the fluid still remaining in the shaped hollow object to escape, separating the half molds and releasing the hollow shaped object.

2. A method according to claim 1, wherein, after stopping the injection of fluid under pressure, there is created a vacuum inside the shaped hollow object in order to expedite evacuation of the fluid used for blowing and of the volatile gases resulting from the manufacturing operation.

3. In an apparatus for shaping hollow plastic objects which comprises two half molds mating together by means of a joint plane, said half molds embodying a molding cavity having the shape of the objects to be manufactured, the combination of: a reciprocating cutting tool having the shape of a solid pin, a passageway provided in one half mold in a substantially radial position with regard to molding cavity and wherein said cutting tool is movable, said passageway having a larger cross-section than said cutting tool, whereby an adequate clearance is provided between said cutting tool and said passageway, at least one blowing duct embodied in one half mold and having port in said clearance between cutting tool and its passageway, said port being close to molding cavity, means for moving said cutting tool and means for supplying said blowing duct with fluid under pressure.

4. An apparatus according to claim 3, wherein said passageway of said cutting tool is inclined with regard to the joint plane of the two half molds.

5. An apparatus according to claim 3, comprising at least one discharge duct provided in one half mold, said discharge duct having port in clearance between said cutting tool and its passageway, said port being close to the molding cavity, and a vacuum generator to which said discharge duct is connected.

References Cited in the file of this patent

UNITED STATES PATENTS

| 2,632,202 | Haimes | Mar. 24, 1953 |
| 2,750,624 | Coates et al. | June 19, 1956 |
| 2,861,406 | Holsman | Nov. 25, 1958 |
| 2,872,760 | Meissner | Feb. 10, 1959 |

FOREIGN PATENTS

| 1,244,286 | France | Sept. 12, 1960 |
| 1,244,287 | France | Sept. 12, 1960 |
| 573,167 | Italy | Feb. 19, 1958 |